United States Patent
Shukla et al.

(10) Patent No.: US 12,299,543 B2
(45) Date of Patent: May 13, 2025

(54) ANOMALOUS TEXT DETECTION AND ENTITY IDENTIFICATION USING EXPLORATION-EXPLOITATION AND PRE-TRAINED LANGUAGE MODELS

(71) Applicant: Optum Technology, Inc., Eden Prairie, MN (US)

(72) Inventors: Vineet Shukla, Bangalore (IN); V Kishore Ayyadevara, Hyderabad (IN); Rohan Khilnani, Hyderabad (IN); Ravi Kumar Raju Gottumukkala, Bangalore (IN); Ankit Varshney, Delhi (IN); Rajat Gupta, Ghaziabad (IN)

(73) Assignee: Optum Technology, Inc., Eden Prairie, MN (US)

( * ) Notice: Subject to any disclaimer, the term of this patent is extended or adjusted under 35 U.S.C. 154(b) by 1222 days.

(21) Appl. No.: 17/018,430

(22) Filed: Sep. 11, 2020

(65) Prior Publication Data

US 2022/0083898 A1 Mar. 17, 2022

(51) Int. Cl.
*G06N 20/00* (2019.01)
*G06F 16/334* (2025.01)
(Continued)

(52) U.S. Cl.
CPC ......... *G06N 20/00* (2019.01); *G06F 16/3346* (2019.01); *G06F 16/353* (2019.01);
(Continued)

(58) Field of Classification Search
CPC ........ G06N 20/00; G06N 7/01; G06F 16/353; G06F 16/3346; G06F 40/20; G06V 30/413
See application file for complete search history.

(56) References Cited

U.S. PATENT DOCUMENTS

| | | |
|---|---|---|
| 7,480,640 B1 | 1/2009 | Elad et al. |
| 9,306,966 B2 | 4/2016 | Eskin et al. |

(Continued)

FOREIGN PATENT DOCUMENTS

| | | |
|---|---|---|
| CN | 109800219 A | 5/2019 |
| IN | 2225MU2015 A | 6/2015 |

OTHER PUBLICATIONS

"Contextual Anomaly Detection in Text Data", by Amogh Mahapatra, taken from https://www.mdpi.com/1999-4893/5/4/469, published 2012, 30 pages. (Year: 2012).*
Chalapathy, Raghavendra et al. "Deep Learning For Anomaly Detection: A Survey," arXiv preprint arXiv:1901.03407, Jan. 10, 2019, pp. 1-50. [Retrieved from the Internet] <URL: https://arxiv.org/pdf/1901.03407.pdf>.

(Continued)

*Primary Examiner* — William L Bashore
*Assistant Examiner* — Gregory A Distefano
(74) *Attorney, Agent, or Firm* — Alston & Bird LLP

(57) ABSTRACT

There is a need for more effective and efficient anomalous text detection. This need can be addressed by, for example, solutions for anomalous text detection that include the steps of performing a group of exploration-exploitation keyword extraction iterations based at least in part on one or more training corpus data entries until a per-iteration keyword list for an ultimate exploration-exploitation keyword extraction iteration satisfies a keyword list threshold condition; and subsequent to performing the exploration-exploitation keyword extraction iterations: processing one or more input corpus data entries using the language-model-based binary classification model to generate one or more inferred anomaly probabilities, processing the one or more input corpus data entries using the keyword model to generate explanatory metadata for the one or more inferred anomaly probabilities, and performing one or more prediction-based actions based at least in part on the one or more inferred anomaly probabilities and the explanatory metadata.

15 Claims, 14 Drawing Sheets

(51) Int. Cl.
*G06F 16/353* (2025.01)
*G06F 40/20* (2020.01)
*G06N 7/01* (2023.01)
*G06V 30/413* (2022.01)

(52) U.S. Cl.
CPC ............... *G06F 40/20* (2020.01); *G06N 7/01* (2023.01); *G06V 30/413* (2022.01)

(56) References Cited

U.S. PATENT DOCUMENTS

| | | | |
|---|---|---|---|
| 2010/0208984 A1* | 8/2010 | Bilenko | G06Q 30/0277 382/218 |
| 2012/0253927 A1* | 10/2012 | Qin | G06Q 30/0241 705/14.49 |
| 2017/0076217 A1* | 3/2017 | Krumm | G06N 20/00 |
| 2017/0235784 A1 | 8/2017 | Seon et al. | |
| 2018/0052849 A1* | 2/2018 | Jagmohan | G06N 20/00 |
| 2018/0239992 A1* | 8/2018 | Chalfin | G06V 10/50 |
| 2018/0314978 A1* | 11/2018 | Kajino | G06N 20/00 |
| 2019/0036952 A1* | 1/2019 | Sim | G06V 10/764 |
| 2019/0188212 A1* | 6/2019 | Miller | H04L 63/145 |
| 2019/0287012 A1 | 9/2019 | Celikyilmaz et al. | |
| 2020/0034436 A1* | 1/2020 | Chen | G06N 3/044 |
| 2020/0104648 A1 | 4/2020 | Yadav | |
| 2021/0019300 A1* | 1/2021 | Marathe | G06F 11/3419 |
| 2021/0287071 A1* | 9/2021 | Ben Fadhel | H04L 63/1425 |
| 2022/0058172 A1* | 2/2022 | John | G06N 3/044 |

OTHER PUBLICATIONS

Denny, Matthew J. et al. "Text Preprocessing For Unsupervised Learning: Why It Matters, When It Misleads, and What To Do About It," SSRN, Sep. 27, 2017, pp. 1-44. DOI: 10.2319.ssm.2849145.

Görnitz, Nico et al. "Toward Supervised Anomaly Detection," Journal of Artificial Intelligence Research, Feb. 20, 2013, vol. 46, pp. 235-262.

Nag, Avishek. "Unsupervised Outlier Detection In Text Corpus Using Deep Learning," Data Driven Investor, May 16, 2019, (17 pages). [Article, Online]. [Retrieved from the Internet Dec. 10, 2020] <URL: https://medium.com/datadriveninvestor/unsupervised-outlier-detection-in-text-corpus-using-deep-learning-41d4284a04c8>.

Nourbakhsh, Armineh et al. "A Framework For Anomaly Detection Using Language Modeling, And Its Applications To Finance," arXiv preprint arXiv:1908.09156. Aug. 24, 2019, (5 pages). [Retrieved from the Internet Dec. 10, 2020] <URL: https://arxiv.org/pdf/1908.09156.pdf>.

Ruff, Lukas et al. "Self-Attentive, Multi-Context One-Class Classification for Unsupervised Anomaly Detection On Text," In Proceedings of the 57th Annual Meeting of the Association for Computational Linguistics, Jul. 2019, pp. pp. 4061-4071.

Zhong, Chen et al. "Deep Actor-Critic Reinforcement Learning For Anomaly Detection," arXiv:1908.10755v1 [cs.LG] Aug. 28, 2019, pp. 1-6. [Retrieved from the Internet Dec. 10, 2020] <URL: https://arxiv.org/pdf/1908.10755.pdf>.

* cited by examiner

| Address |
|---|
| po box 21506 |
| 1510 bluff st |
| 300 halket st ste 5500 |
| 1241 blakeslee blvd e |
| 3410 worth st ste 860 |
| 75 st rm 411 |
| 1924 hwy ste 5 |
| webber st |
| broadway ext ste 100 |
| 2964 n state road 7 ste |

| Addresses | Label (Normal Outlier) |
|---|---|
| 611 218 Sunset Rd Willingboro Burlington NJ 08046 | 1 |
| 612 8012 3rd Ave Brooklyn Kings NY 11209 | 1 |
| 613 3401 Civic Center Blvd Philadelphia PA 19104 | 1 |
| 614 114 Gateway Corporate Blvd Ste 330 Columbia Richland SC 29203 | 1 |
| 615 800 E Gate Blvd Garden City NY 11530 | 1 |
| 621 218 Sunset Rd Willingboro Burlington NJ 08046 | 0 |
| 622 8012 3rd Ave Brooklyn Kings NY 11209 | 0 |
| 623 3401 Civic Center Blvd Philadelphia PA 19104 | 0 |
| 624 114 Gateway Corporate Blvd Ste 330 Columbia Richland SC 29203 | 0 |
| 625 800 E Gate Blvd Garden City NY 11530 | 0 |

Rows 611–615 belong to group 601; rows 621–625 belong to group 602.

FIG. 6

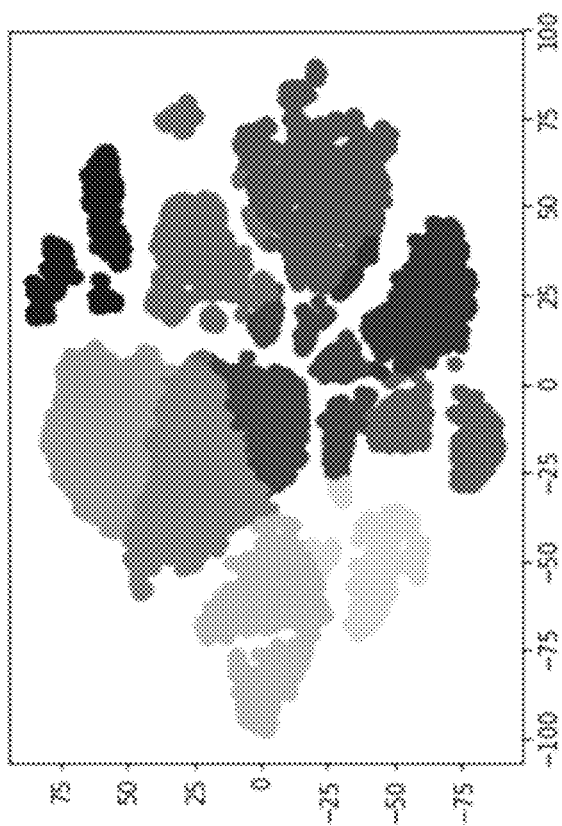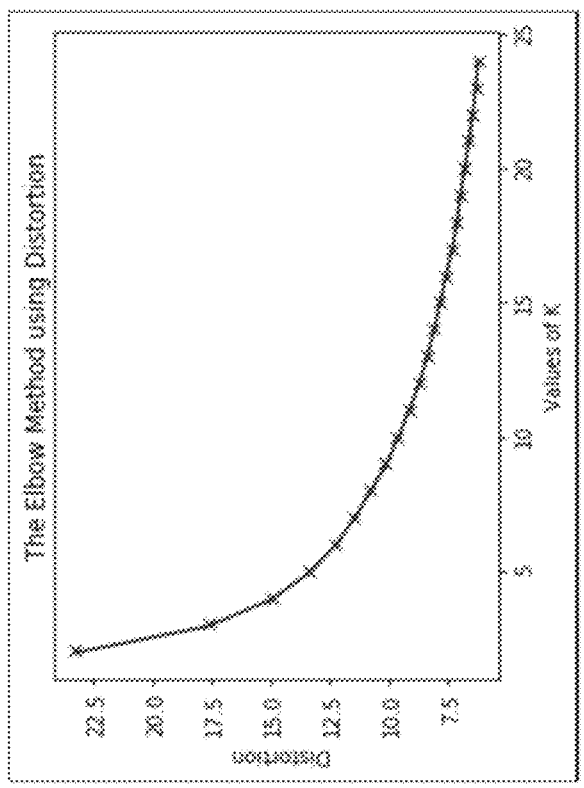
FIG. 12

| Text | Anomalous? | Reason |
|---|---|---|
| 1401 2485 Hamilton | Yes | Missing St/Rd/etc. |
| 1402 Chestnut St. 123 | Yes | Building number follows the street name |
| 1403 2444 5th St. | No | N/A |
| 2434 Johnson St. | No | N/A |

ANOMALOUS TEXT DETECTION AND ENTITY IDENTIFICATION USING EXPLORATION-EXPLOITATION AND PRE-TRAINED LANGUAGE MODELS

BACKGROUND

Various embodiments of the present invention address technical challenges related to performing anomalous text detection. Various embodiments of the present invention address the shortcomings of existing anomalous text detection systems and disclose various techniques for efficiently and reliably performing anomalous text detection.

BRIEF SUMMARY

In general, embodiments of the present invention provide methods, apparatus, systems, computing devices, computing entities, and/or the like for performing anomalous text detection. Certain embodiments of the present invention utilize systems, methods, and computer program products that perform anomalous text detection by utilizing at least one of exploration-exploitation keyword extraction routines, trained binary classifier models generated during the exploration phase of exploration-exploitation keyword extraction routines, keyword models generated using information determined during the exploitation phase of exploration-exploitation keyword extraction routines, and/or the like.

In accordance with one aspect, a method is provided. In one embodiment, the method comprises: performing a plurality of exploration-exploitation keyword extraction iterations based at least in part on one or more training corpus data entries until a per-iteration keyword list for an ultimate exploration-exploitation keyword extraction iteration of the plurality of iterative exploration-exploitation keyword extraction iterations satisfies a keyword list threshold condition, wherein: each exploration-exploitation keyword extraction iteration of the plurality of iterative exploration-exploitation keyword extraction iterations is associated with an exploration phase and an exploitation phase, performing each exploration phase for an exploration-exploitation keyword extraction iteration of the plurality of iterative exploration-exploitation keyword extraction iterations comprises: (i) generating one or more anomalous data entries for the exploration-exploitation keyword extraction iteration, (ii) training the language-model-based binary classification model based at least in part on the one or more anomalous data entries and the one or more training corpus data entries, and (iii) processing the one or more anomalous data entries using the language-model-based binary classification model to generate per-entry anomaly probabilities for the exploration-exploitation keyword extraction iteration in relation to the one or more anomalous data entries, and performing each exploitation phase for an exploration-exploitation keyword extraction iteration of the plurality of iterative exploration-exploitation keyword extraction iterations comprises generating the per-iteration keyword list for the exploration-exploitation keyword extraction iteration based at least in part on the one or more per-entry anomaly probabilities for the exploration-exploitation keyword extraction iteration; updating a keyword model based at least in part on each per-iteration keyword list generated during an exploration-exploitation keyword extraction iteration of the plurality of iterative exploration-exploitation keyword extraction iterations; and enabling access to the language-model-based binary classification model and the keyword model for performing one or more anomaly detection inferences, wherein performing the anomaly detection inferences comprises: processing one or more input corpus data entries using the language-model-based binary classification model to generate one or more inferred anomaly probabilities for the one or more input corpus data entries, processing the one or more input corpus data entries using the keyword model to generate explanatory metadata for the one or more inferred anomaly probabilities, and performing one or more prediction-based actions based at least in part on the one or more inferred anomaly probabilities and the explanatory metadata.

In accordance with another aspect, a computer program product is provided. The computer program product may comprise at least one computer-readable storage medium having computer-readable program code portions stored therein, the computer-readable program code portions comprising executable portions configured to: perform a plurality of exploration-exploitation keyword extraction iterations based at least in part on one or more training corpus data entries until a per-iteration keyword list for an ultimate exploration-exploitation keyword extraction iteration of the plurality of iterative exploration-exploitation keyword extraction iterations satisfies a keyword list threshold condition, wherein: each exploration-exploitation keyword extraction iteration of the plurality of iterative exploration-exploitation keyword extraction iterations is associated with an exploration phase and an exploitation phase, performing each exploration phase for an exploration-exploitation keyword extraction iteration of the plurality of iterative exploration-exploitation keyword extraction iterations comprises: (i) generating one or more anomalous data entries for the exploration-exploitation keyword extraction iteration, (ii) training the language-model-based binary classification model based at least in part on the one or more anomalous data entries and the one or more training corpus data entries, and (iii) processing the one or more anomalous data entries using the language-model-based binary classification model to generate per-entry anomaly probabilities for the exploration-exploitation keyword extraction iteration in relation to the one or more anomalous data entries, and performing each exploitation phase for an exploration-exploitation keyword extraction iteration of the plurality of iterative exploration-exploitation keyword extraction iterations comprises generating the per-iteration keyword list for the exploration-exploitation keyword extraction iteration based at least in part on the one or more per-entry anomaly probabilities for the exploration-exploitation keyword extraction iteration; update a keyword model based at least in part on each per-iteration keyword list generated during an exploration-exploitation keyword extraction iteration of the plurality of iterative exploration-exploitation keyword extraction iterations; and enable access to the language-model-based binary classification model and the keyword model for performing one or more anomaly detection inferences, wherein performing the anomaly detection inferences comprises: processing one or more input corpus data entries using the language-model-based binary classification model to generate one or more inferred anomaly probabilities for the one or more input corpus data entries, processing the one or more input corpus data entries using the keyword model to generate explanatory metadata for the one or more inferred anomaly probabilities, and performing one or more prediction-based actions based at least in part on the one or more inferred anomaly probabilities and the explanatory metadata.

In accordance with yet another aspect, an apparatus comprising at least one processor and at least one memory including computer program code is provided. In one embodiment, the at least one memory and the computer program code may be configured to, with the processor, cause the apparatus to: perform a plurality of exploration-exploitation keyword extraction iterations based at least in part on one or more training corpus data entries until a per-iteration keyword list for an ultimate exploration-exploitation keyword extraction iteration of the plurality of iterative exploration-exploitation keyword extraction iterations satisfies a keyword list threshold condition, wherein: each exploration-exploitation keyword extraction iteration of the plurality of iterative exploration-exploitation keyword extraction iterations is associated with an exploration phase and an exploitation phase, performing each exploration phase for an exploration-exploitation keyword extraction iteration of the plurality of iterative exploration-exploitation keyword extraction iterations comprises: (i) generating one or more anomalous data entries for the exploration-exploitation keyword extraction iteration, (ii) training the language-model-based binary classification model based at least in part on the one or more anomalous data entries and the one or more training corpus data entries, and (iii) processing the one or more anomalous data entries using the language-model-based binary classification model to generate per-entry anomaly probabilities for the exploration-exploitation keyword extraction iteration in relation to the one or more anomalous data entries, and performing each exploitation phase for an exploration-exploitation keyword extraction iteration of the plurality of iterative exploration-exploitation keyword extraction iterations comprises generating the per-iteration keyword list for the exploration-exploitation keyword extraction iteration based at least in part on the one or more per-entry anomaly probabilities for the exploration-exploitation keyword extraction iteration; update a keyword model based at least in part on each per-iteration keyword list generated during an exploration-exploitation keyword extraction iteration of the plurality of iterative exploration-exploitation keyword extraction iterations; and enable access to the language-model-based binary classification model and the keyword model for performing one or more anomaly detection inferences, wherein performing the anomaly detection inferences comprises: processing one or more input corpus data entries using the language-model-based binary classification model to generate one or more inferred anomaly probabilities for the one or more input corpus data entries, processing the one or more input corpus data entries using the keyword model to generate explanatory metadata for the one or more inferred anomaly probabilities, and performing one or more prediction-based actions based at least in part on the one or more inferred anomaly probabilities and the explanatory metadata.

BRIEF DESCRIPTION OF THE DRAWINGS

Figure 1:
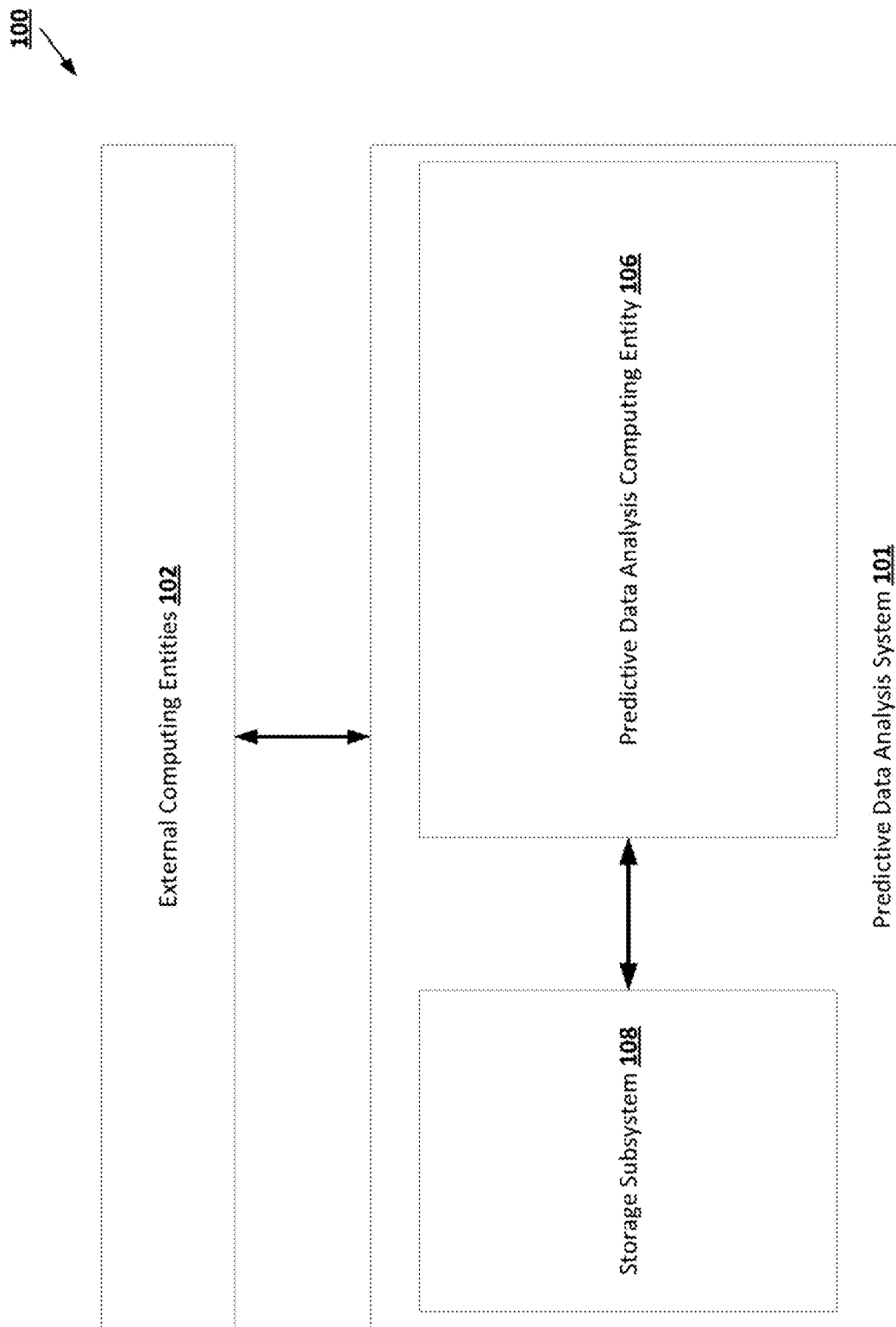

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
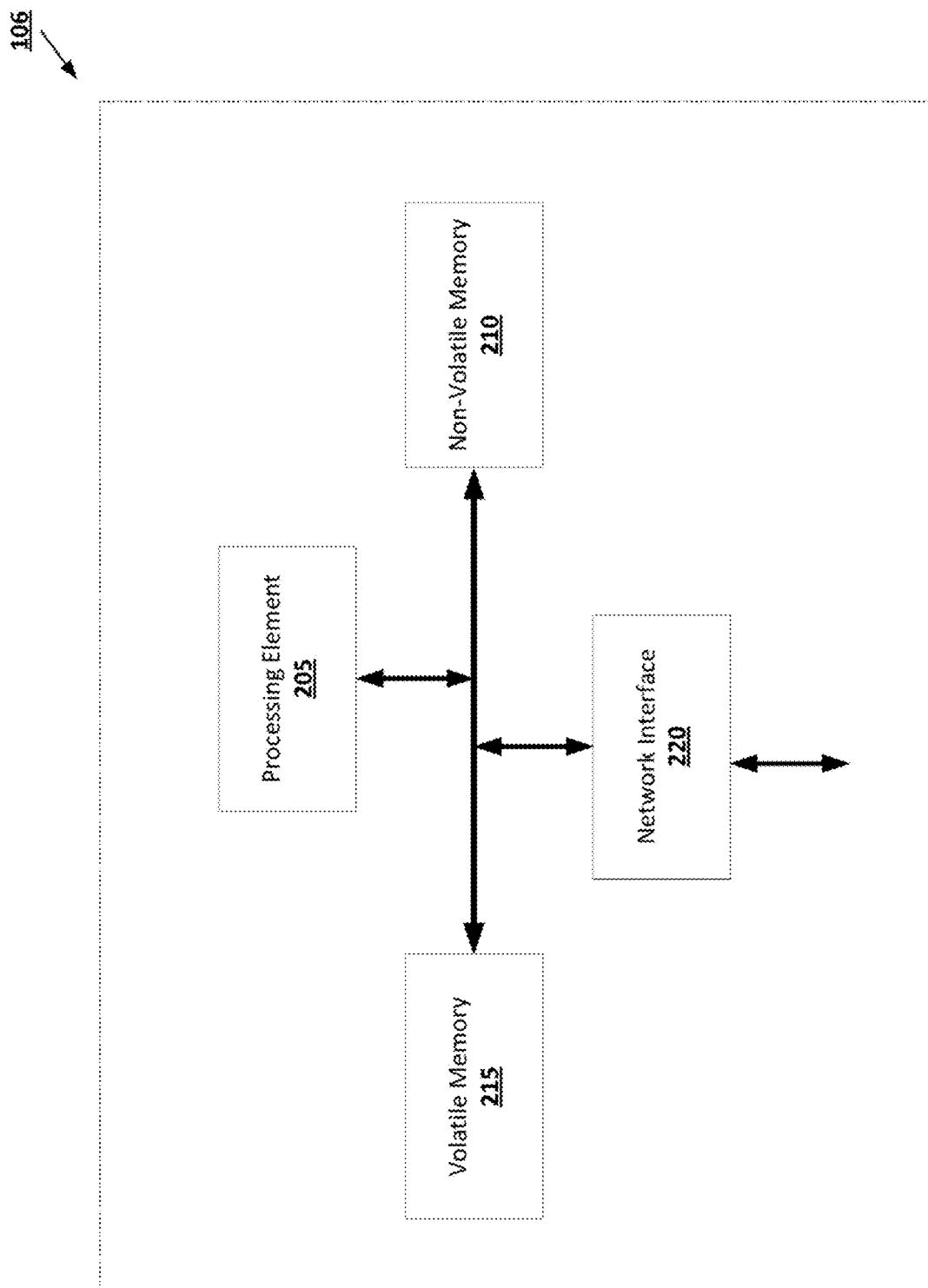

FIG. 2 provides an example predictive data analysis computing entity in accordance with some embodiments discussed herein.

Figure 3:
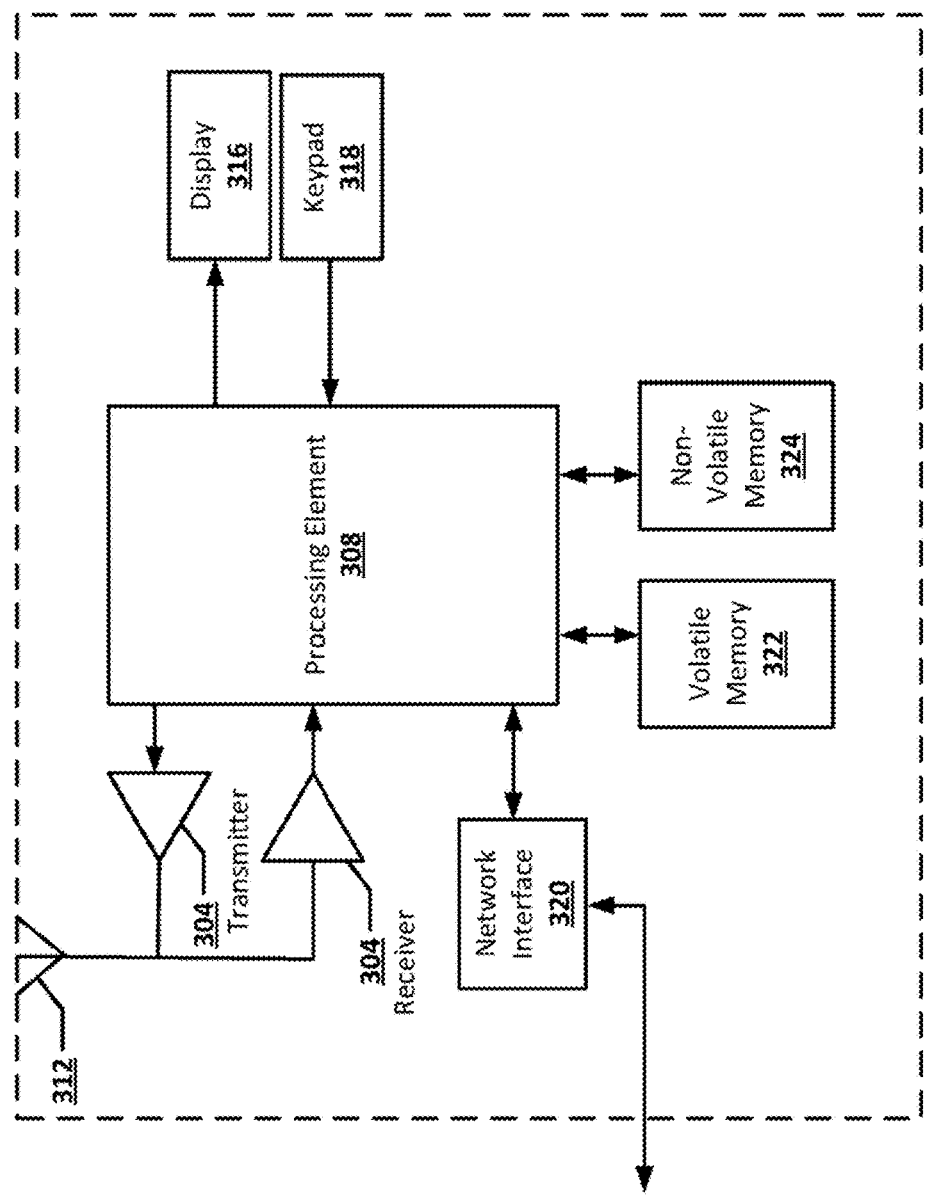

FIG. 3 provides an example external computing entity in accordance with some embodiments discussed herein.

Figure 4:
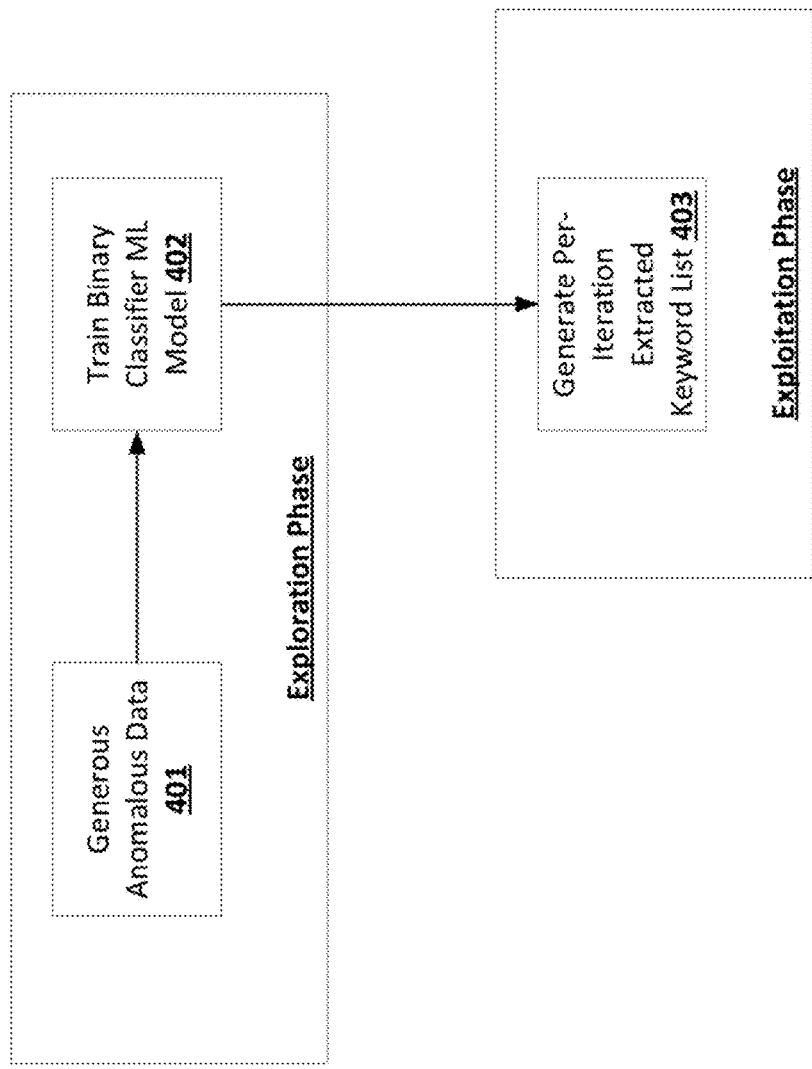

FIG. 4 is a flowchart diagram of an example process for generating a trained language-model-based binary classification model configured to perform anomalous text detection as well as a keyword model configured to enable performing entity type extraction in order to facilitate generating explanatory metadata for the output of the anomalous text detection in accordance with some embodiments discussed herein.

FIG. 5 provides an operational example of performing anomalous text detection in accordance with some embodiments discussed herein.

FIG. 6 provides an operational example of generating anomalous text data based at least in part on a training text corpus in accordance with some embodiments discussed herein.

Figure 7:
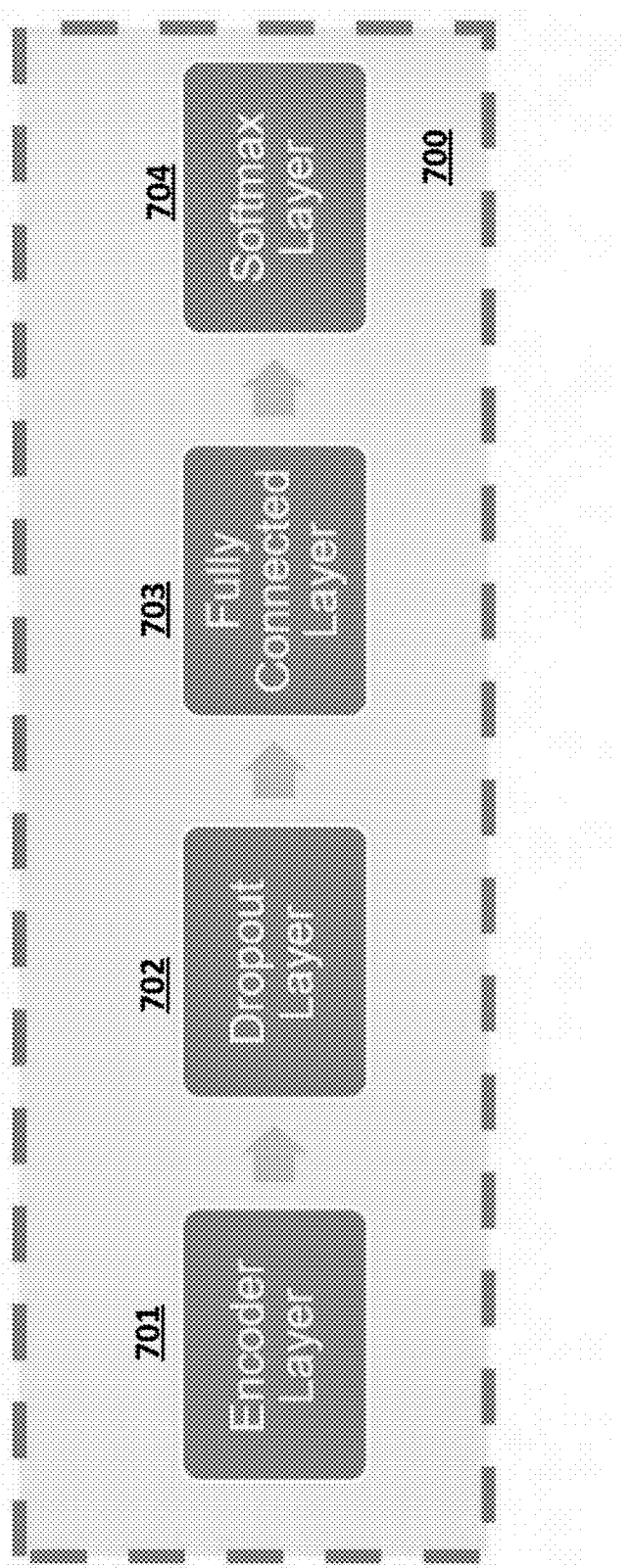

FIG. 7 provides an operational example of a language-model-based binary classification model in accordance with some embodiments discussed herein.

Figure 8:
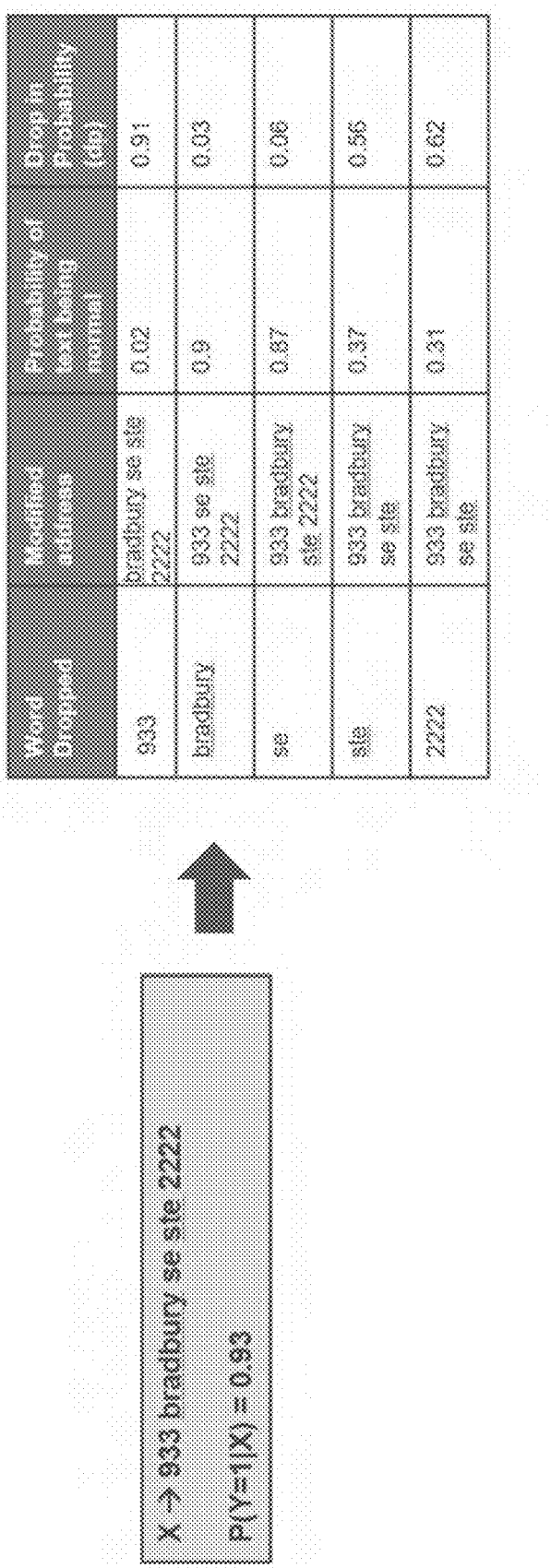

FIG. 8 provides an operational example of generating importance measures for dropped words in accordance with some embodiments discussed herein.

Figure 9:
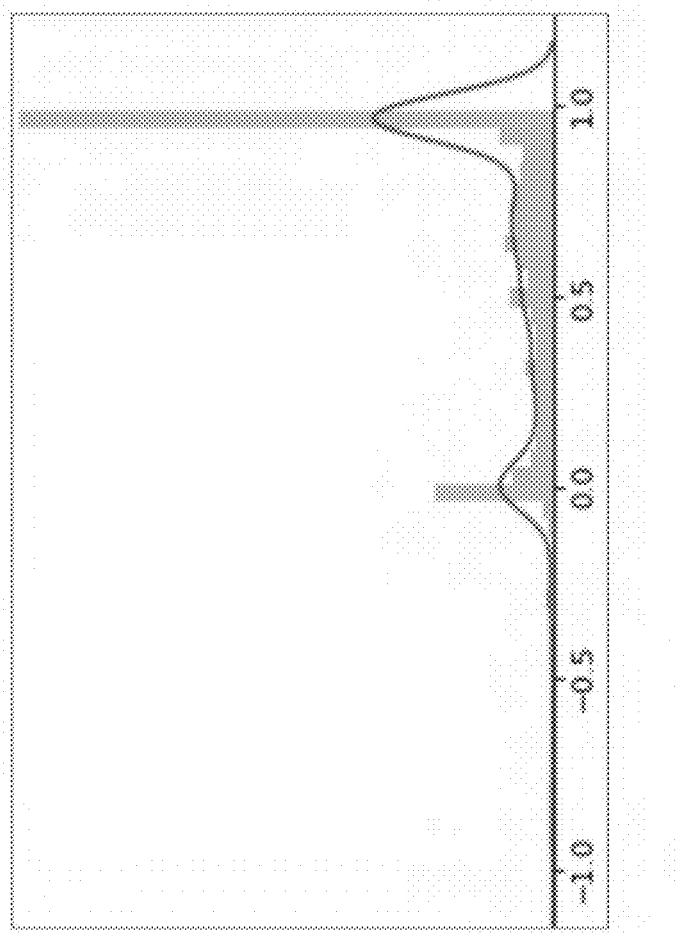

FIG. 9 provides an operational example of determining an average importance measure for a word based at least in part on average change in anomalous probability due to the word across many sentences in accordance with some embodiments discussed herein.

Figure 10:
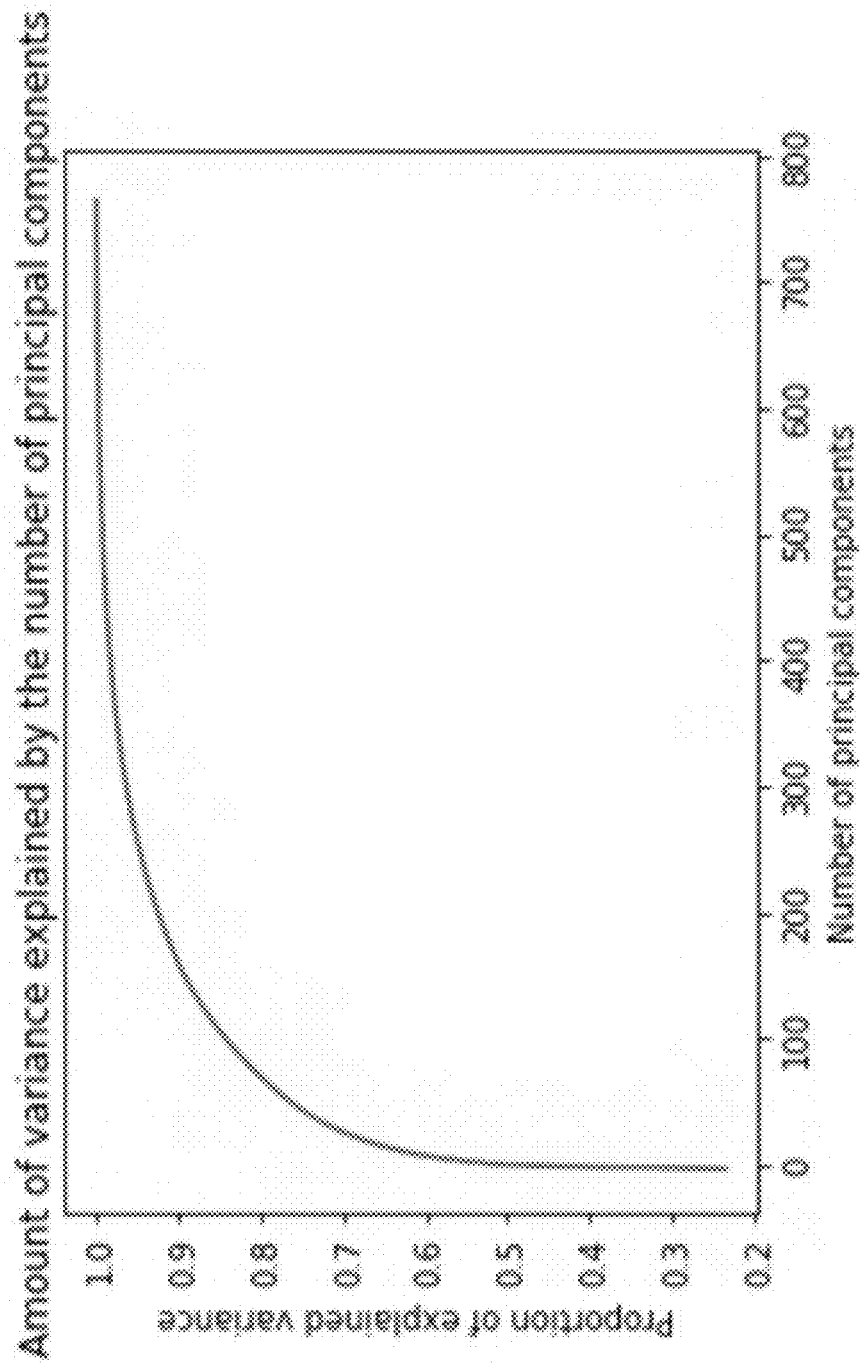

FIG. 10 provides an operational example of results of performing a dimensionality reduction operation that uses principal component analysis to reduce the dimensions of per-keyword encoded representations in accordance with some embodiments discussed herein.

Figure 11:
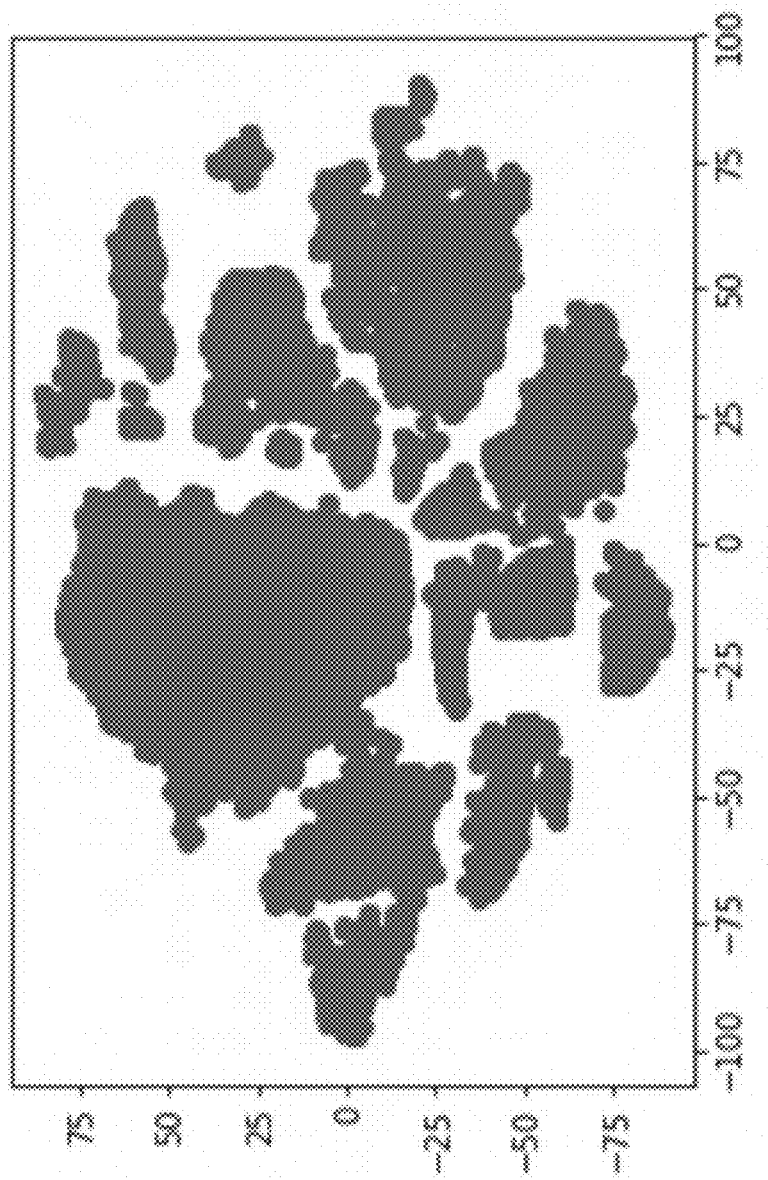

FIG. 11 provides an operational example of the results of performing t-distributed stochastic neighbor embedding on reduced encoded representations of identified keywords in accordance with some embodiments discussed herein.

FIG. 12 provides operational example of the results of performing K-means on unlabeled keyword clusters generated using t-distributed stochastic neighbor embedding in accordance with some embodiments discussed herein.

Figure 13:
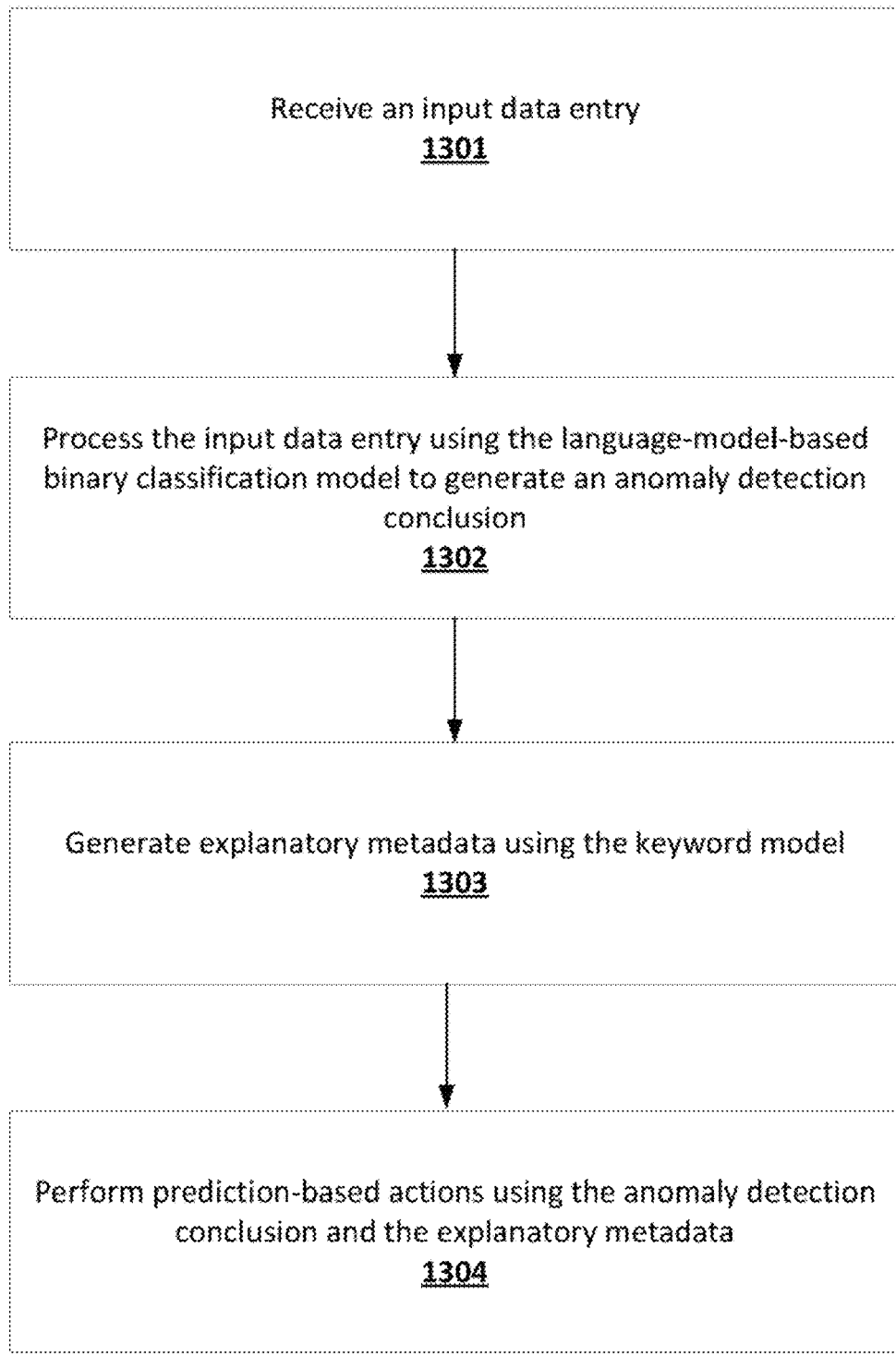

FIG. 13 is a flowchart diagram of an example process for performing anomalous text detection in accordance with some embodiments discussed herein.

FIG. 14 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Outlier detection, especially for text data, has been a challenging task for many machine learning solutions, especially in the absence of wide availability of labeled training data. Among the reasons for this difficulty is that it may be difficult to clearly define what an outlier is in text data, and to learn the patterns used to classify certain text segments within a corpus as bad or unacceptable. While clustering methods or other rule-based unsupervised methods are generally used to perform outlier detection, these methods may fail on abstract unseen data, since their robustness is hampered by the fact that the decisions for these methods are based on/modelled on certain rules, and that any data point that does not particularly fit those rules is likely to be misclassified, leading to a high error rate on the validation set. These methods are hence, not generalizable, and are thus inefficient. Moreover, there is also the problem of lack of widespread availability of labeled training data points needed to define what a particular text outlier really is.

To address the above noted challenges, the present invention presents an approach to detecting outliers in a text corpus that is able to capture important entities in the corpus and perform well on unseen data. The noted framework is based at least in part on an exploration-exploitation framework according to which labeled outlier text data is first created by dropping a word from a certain proportion of the data at random and training a binary classifier to predict these outliers from the original or normal ones. Since this is a crude hypothesis that may not lead to reliable results at first, various embodiments of the present invention then identify some important entities in the text, including entities that affect the probability of a certain text when it is predicted by the model, and drop those identified important entities instead of randomly dropping entities during successive exploration-exploitation iterations performed to generate a trained binary classifier model. Thus, in a next exploration-exploitation iteration, influential words are dropped instead of random words, and a classifier model is again trained on this new corpus. This process may be iteratively repeated until the number of influential words converges below a certain threshold.

By utilizing the above-noted techniques, various embodiments of the present invention address at least two primary challenges of existing outlier/anomalous text detection solutions: first, by generating labeled training data during an exploration phase, various embodiments of the present invention are able to operate in environments in which adequate labeled training data is not available to train outlier/anomalous detection machine learning models, a feature that in turn increases the training efficiency and the overall practical suitability of outlier/anomalous detection machine learning models; second, by determining word importance measures for words determined important in previous iterations of an exploration-exploitation process, various embodiments of the present invention present a dynamic outlier/anomalous text detection solution that is able to detect outlier/anomalous texts both faster and more efficiently as well as with a higher degree of accuracy/certainty. Thus, by addressing some of the primary technical challenges of existing outlier/anomalous text detection solutions, various embodiments of the present invention substantially improve the efficiency and reliability of performing outlier/anomalous text detection and make significant technical contributions to improving the field of outlier/anomalous text detection.

II. Definitions

The term "anomalous text detection" may refer to a computer-implemented process that is configured to determine whether an input data entry is deemed to have a sequence of entity types that is deemed anomalous or outlier, e.g., whether an input data entry is missing one or more required entity types and/or whether an input data entry includes an incorrect ordering of entity types. For example, consider a group of text data objects that are configured to describe complete addresses. In the noted example, the following input data entries may be deemed to include a sequence of entity types that is deemed anomalous or outlier because they fail to include all required entity types for a complete address: Bluff Street (because the input data entry does not include any building number designators) and 1510 Street (because the input data entry does not include any pathway name designators). Furthermore, in the previously mentioned example, the following input data entries may be deemed to include a sequence of entity types that is deemed to include an incorrect ordering of entity types: 2964 Fifth Street Avenue (because the pathway type designator "Avenue" is not expected to follow another pathway type designator) and 2964 N State Road 7 Street (because the pathway type designator "Road" is not expected to be followed by a building number designator).

The term "entity type extraction" may refer to a computer-implemented process that is configured to determine, for each keyword associated with an input data entry, an entity type associated with the keyword. For example, given the input data entry "2485 Chestnut Street", the keyword "2485" may be associated with a building number designator entity type, the keyword "Chestnut" may be associated with a pathway name designator entity type, and the keyword "Street" may be associated with a pathway type designator. As another example, given the input data entry "PO Box 21506", the keyword "PO Box" may be associated with an address type designator entity type and the "21506" may be associated with a mailing address number entity type. As yet another example, given the input data entry "sinus rhythm, Q-T interval prolongation, and low amplitude T waves," the keyword "sinus rhythm" may be associated with a rhythm format descriptor entity type, the keyword "Q-T interval prolongation" may be associated with an interval format descriptor entity type, and the keyword "low amplitude T waves" may be associated with a wave property descriptor entity type.

The term "explanatory metadata" may refer to a data object that is configured to describe an inferred reason for a determination that a particular input data entry is deemed anomalous. For example, the explanatory metadata for a particular input data entry that is deemed anomalous may describe that the particular input data entry is deemed anomalous because it fails to include one or more required entity types and/or because it fails to include an expected ordering of entity types. In an exemplary embodiment, given the input data entry "Bluff Street" that is deemed anomalous, the explanatory metadata for the particular input data entry may describe that the particular input data entry is deemed anomalous because it fails to include an entity having a building number designator entity type. In the noted example, to generate the noted explanatory metadata describing that the particular input data entry is deemed anomalous because it fails to include an entity having a building number designator entity type, a computer system may utilize a training corpus to generate a keyword model that describes the expected orderings of entities based at least in part on entity types of those entities, and may use the generated keyword model to determine a likely explanation for the predictive inference about the anomalous nature of the particular input data entry.

The term "exploration-exploitation keyword extraction iteration" may refer to a group of computer-implemented operations characterized by an exploration phase and an exploitation phase. During the exploration phase of an exploration-exploitation keyword extraction iteration, a training corpus comprising a group of training corpus data entries is processed to first generate anomalous data for the exploration-exploitation keyword extraction iteration, then both the anomalous data and the training corpus are used to train a language-model-based binary classification model that is configured to generate an anomaly probability for each input data entry, and then the anomality probabilities generated by the language-model-based binary classification model during training are supplied to an exploitation phase of the exploration-exploitation keyword extraction iteration. During the exploitation phase of an exploration-exploitation keyword extraction iteration, the anomaly probabilities generated during the exploration phase are used to identify keywords for the exploration-exploitation keyword extraction iteration, then encoded representations of the identified keywords (e.g., encoded representations generated using an encoding layer of the language-model-based binary classification model) are used to determine labeled keyword clusters for each identified keyword, and then the labeled keyword clusters are used to update a keyword model associated with the training corpus.

The term "keyword list threshold condition" may refer to a data object that describes a termination condition for a group of exploration-exploitation keyword extraction iterations. In some embodiments, a predictive data analysis computing entity may determine a logic defined for determining a suitable number of exploration-exploitation keyword extraction iterations, where the noted logic may in turn depend at least in part on a keyword list threshold condition. For example, the predictive data analysis computing entity may determine that the number of exploration-exploitation keyword extraction iterations should continue until an exploration-exploitation keyword extraction iteration during which a deviation measure between the per-iteration extracted keyword list for the exploration-exploitation keyword extraction iteration and the per-iteration extracted keyword list for an immediately preceding exploration-exploitation keyword extraction iteration fails to satisfy a deviation measure threshold (e.g., falls below a deviation measure threshold calculated based at least in part on five percent of the total words identified among the group of training corpus data entries). As another example, the predictive data analysis computing entity may determine that the number of exploration-exploitation keyword extraction iterations should continue until an exploration-exploitation keyword extraction iteration during which the per-iteration extracted keyword list has a keyword count that falls below a keyword count threshold (e.g., falls below a keyword count threshold calculated based at least in part on five percent of the total words identified among the group of training corpus data entries). As yet another example, the predictive data analysis computing entity may first perform a predefined number (e.g., five) exploration-exploitation keyword extraction iterations and then determine whether a deviation measure between the per-iteration extracted keyword list for the final (e.g., fifth) exploration-exploitation keyword extraction iteration of the predefined number of exploration-exploitation keyword extraction iterations and the per-iteration extracted keyword list for an initial exploration-exploitation keyword extraction iteration fails to satisfy a deviation measure threshold (e.g., falls below a threshold calculated based at least in part on five percent of the total words identified among the group of training corpus data entries). Afterward, the predictive data analysis computing entity may determine whether the keyword list threshold condition is satisfied based at least in part on whether the per-iteration extracted keyword list generated by the final (e.g., fifth) exploration-exploitation keyword extraction iteration of the predefined number of exploration-exploitation keyword extraction iterations and the per-iteration extracted keyword list for an initial exploration-exploitation keyword extraction iteration fails to satisfy a deviation measure threshold (e.g., falls below a threshold calculated based at least in part on five percent of the total words identified among the group of training corpus data entries).

The term "language-model-based binary classification model" may refer to a data object that describes parameters and/or hyper-parameters of a machine learning model that is configured to generate an anomaly probability for each input data entry. In some embodiments, a the language-model-based binary classification model may have an encoder layer, a dropout layer, a group of fully connected layers, and a softmax layer. The encoder layer may be configured to receive an input data object (e.g., a text corpus data entry or an anomalous data entry) and generate an encoded representation of the input data object. Examples of the encoder layer include layers that utilize one or more bidirectional encoders, such as one or more Bidirectional Encoder Representations from Transfer (BERT) models including pre-trained BERT models as well as BERT models trained from scratch. The dropout layer may process the encoded representation generated by the encoder layer in order to generate a dropout representation of the input data object. The group of fully connected layers may be configured to process the dropout representation generated by the dropout layer to generate a non-normalized anomaly probability score. The softmax layer may be configured to process the non-normalized anomaly probability score generated by the group of fully connected layers in order to generate the anomaly probability score.

The term "per-iteration extracted keyword list" may refer to a data object that describes a group of words deemed to be important as a result of operations of a corresponding exploration-exploitation keyword extraction iteration. In some embodiments, during the exploration phase of an exploration-exploitation keyword extraction iteration, a predictive data analysis computing entity generates the per-iteration extracted keyword list for the initial exploration-exploitation keyword extraction iteration. To do so, the predictive data analysis computing entity computes a measure of deviation of each anomaly probability for an anomalous data entry from the anomaly probability for the training corpus data entry used to generate the anomalous data entry and uses this measure of deviation as an importance measure for the word removed from the training corpus data entry to generate the anomalous data entry. Thereafter, the predictive data analysis computing entity 106 determines that each word whose importance measure satisfies an importance measure threshold condition (e.g., whose importance measure falls below an importance measure threshold value) is an extracted keyword for the exploration-exploitation keyword extraction iteration that should be included in the per-iteration extracted keyword list for the exploration-exploitation keyword extraction iteration. If a word is dropped from more than one input data entry, the importance measure for the word is determined based at least in part on a measure of statistical distribution (e.g., an average) of the importance measures calculated for the word on a per-entry basis. For example, if a word is dropped from three sentences, the importance measure for the word may be determined based at least in part on an average of the importance measure for the word determined based at least in part on the first sentence of the three sentences, the importance measure for the word determined based at least in part on the second sentence of the three sentences, and the importance measure for the word determined based at least in part on the third sentence of the three sentences.

The term "keyword model" may refer to a data object that describes a group of keywords deemed important to anomalous text detection as well as a labeled keyword cluster for each keyword in the group of keywords. In some embodiments, a predictive data analysis computing entity generates a labeled cluster for each word in the per-iteration extracted keyword list for an exploration-exploitation keyword extraction iteration. To do so, the predictive data analysis computing entity may first process each keyword identified in the per-iteration extracted keyword list for the exploration-exploitation keyword extraction iteration using an encoding machine learning model (e.g., the encoding layer of the language-model-based binary classification model, such as the BERT-based encoding layer of the language-model-based binary classification model) to generate an encoded representation of the identified keyword. Afterward, the predictive data analysis computing entity may process the encoded representations of the identified keywords in the per-iteration extracted keyword list for the exploration-exploitation keyword extraction iteration to generate a labeled keyword cluster for each identified keyword in the per-iteration extracted keyword list and may use the labeled keyword clusters for the identified keywords to supplement the keyword model.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a prediction that can be generated using the predictive data analysis system 101 is a prediction about whether an input data entry such as a text input data entry is deemed anomalous, outlier, erroneous, incomplete, and/or the like.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

FIG. 4 is a flowchart diagram of an example process 400 for generating a bidirectional classifier machine learning model that is configured to perform anomalous text detection as well as a keyword model that is configured to enable performing entity type extraction in order to facilitate generating explanatory metadata for the output of the anomalous text detection. Anomalous text detection, entity type extraction, and generating explanatory metadata are described in greater detail below, before proceeding to describe operations of the process 400 in greater detail.

Anomalous text detection may be a computer-implemented process that is configured to determine whether an input data entry is deemed to have a sequence of entity types that is deemed anomalous or outlier, e.g., whether an input data entry is missing one or more required entity types and/or whether an input data entry includes an incorrect ordering of entity types. For example, consider a group of text data objects that are configured to describe complete addresses. In the noted example, the following input data entries may be deemed to include a sequence of entity types that is deemed anomalous or outlier because they fail to include all required entity types for a complete address: Bluff Street (because the input data entry does not include any building number designators) and 1510 Street (because the input data entry does not include any pathway name designators). Furthermore, in the previously mentioned example, the following input data entries may be deemed to include a sequence of entity types that is deemed to include an incorrect ordering of entity types: 2964 Fifth Street Avenue (because the pathway type designator "Avenue" is not expected to follow another pathway type designator) and 2964 N State Road 7 Street (because the pathway type designator "Road" is not expected to be followed by a building number designator).

An operational example of performing anomalous text detection is depicted in FIG. 5. As depicted in FIG. 5, among the input text data corpus 501, the input data entries in the segment 511 of the corresponding input data entries are deemed anomalous. For example, with respect to the input data entry 521 in the segment 511, the predictive data analysis computing entity 106 may determine that the input data entry 521 is deemed anomalous because the input data entry 521 includes an apparent pathway type designator "rm" after another pathway type designator "st" and/or because the input data entry 521 includes a building number designator "411" at the end of the input data entry 521. As another example, with respect to the input data entry 522 in the segment 511, the predictive data analysis computing entity 106 may determine that the input data entry 522 is deemed anomalous because the input data entry 522 includes an apparent pathway type designator "ste" after another pathway type designator "hwy" and/or because the input data entry 522 includes a building number designator "5" at the end of the input data entry 522. As yet another example, with respect to the input data entry 523 in the segment 511, the predictive data analysis computing entity 106 may determine that the input data entry 523 is deemed anomalous because the input data entry 523 does not include any building number designator before the pathway name designator "webber".

Entity type extraction may be a computer-implemented process that is configured to determine, for each keyword associated with an input data entry, an entity type associated with the keyword. For example, given the input data entry "2485 Chestnut Street", the keyword "2485" may be associated with a building number designator entity type, the keyword "Chestnut" may be associated with a pathway name designator entity type, and the keyword "Street" may be associated with a pathway type designator. As another example, given the input data entry "PO Box 21506", the keyword "PO Box" may be associated with an address type designator entity type and the "21506" may be associated with a mailing address number entity type. As yet another example, given the input data entry "sinus rhythm, Q-T interval prolongation, and low amplitude T waves," the keyword "sinus rhythm" may be associated with a rhythm format descriptor entity type, the keyword "Q-T interval prolongation" may be associated with an interval format descriptor entity type, and the keyword "low amplitude T waves" may be associated with a wave property descriptor entity type.

Aspects of various embodiments of the present invention utilize output of entity extraction to generate explanatory metadata for the output of anomalous text detection. In general, the explanatory metadata may describe an inferred reason for a determination that a particular input data entry is deemed anomalous. For example, the explanatory metadata for a particular input data entry that is deemed anomalous may describe that the particular input data entry is deemed anomalous because it fails to include one or more required entity types and/or because it fails to include an expected ordering of entity types. In an exemplary embodiment, given the input data entry "Bluff Street" that is deemed anomalous, the explanatory metadata for the particular input data entry may describe that the particular input data entry is deemed anomalous because it fails to include an entity having a building number designator entity type. In the noted example, to generate the noted explanatory metadata describing that the particular input data entry is deemed anomalous because it fails to include an entity having a building number designator entity type, a computer system may utilize a training corpus to generate a keyword model that describes the expected orderings of entities based at least in part on entity types of those entities, and may use the generated keyword model to determine a likely explanation for the predictive inference about the anomalous nature of the particular input data entry.

Turning now to FIG. 4, the process 400 includes performing a number of exploration-exploitation keyword extraction iterations on a group of training corpus data entries (e.g., training address data entries, training clinical note data entries, and/or the like). In particular, the predictive data analysis computing entity 106 may determine a logic defined for determining a suitable number of exploration-exploitation keyword extraction iterations, where the noted logic may in turn depend at least in part on a keyword list threshold condition.

For example, the predictive data analysis computing entity 106 may determine that the number of exploration-exploitation keyword extraction iterations should continue until an exploration-exploitation keyword extraction iteration during which a deviation measure between the per-iteration extracted keyword list for the exploration-exploitation keyword extraction iteration and the per-iteration extracted keyword list for an immediately preceding exploration-exploitation keyword extraction iteration fails to satisfy a deviation measure threshold (e.g., falls below a deviation measure threshold calculated based at least in part on five percent of the total words identified among the group of training corpus data entries). As another example, the predictive data analysis computing entity 106 may determine that the number of exploration-exploitation keyword extraction iterations should continue until an exploration-exploitation keyword extraction iteration during which the per-iteration extracted keyword list has a keyword count that falls below a keyword count threshold (e.g., falls below a keyword count threshold calculated based at least in part on five percent of the total words identified among the group of training corpus data entries). As yet another example, the predictive data analysis computing entity 106 may first perform a predefined number (e.g., five) exploration-exploitation keyword extraction iterations and then determine whether a deviation measure between the per-iteration extracted keyword list for the final (e.g., fifth) exploration-exploitation keyword extraction iteration of the predefined number of exploration-exploitation keyword extraction iterations and the per-iteration extracted keyword list for an initial exploration-exploitation keyword extraction iteration fails to satisfy a deviation measure threshold (e.g., falls below a threshold calculated based at least in part on five percent of the total words identified among the group of training corpus data entries). Afterward, the predictive data analysis computing entity 106 may determine whether the keyword list threshold condition is satisfied if the measure of deviation between the per-iteration extracted keyword list generated by the final (e.g., fifth) exploration-exploitation keyword extraction iteration of the predefined number of exploration-exploitation keyword extraction iterations and the per-iteration extracted keyword list for an initial exploration-exploitation keyword extraction iteration fails to satisfy a deviation measure threshold (e.g., falls below a threshold calculated based at least in part on five percent of the total words identified among the group of training corpus data entries).

As an exemplary embodiment, consider a training corpus comprising one thousand identified words. Consider further that: (i) during a first exploration-exploitation keyword extraction iteration, a per-iteration extracted keyword list of 200 words is extracted, (ii) during a second exploration-exploitation keyword extraction iteration, a per-iteration extracted keyword list of 140 words is extracted, and (iii) during a third exploration-exploitation keyword extraction iteration, a per-iteration extracted keyword list of 100 words is extracted. In the noted exemplary embodiment, given the first thresholding logic discussed in the preceding paragraph, and further given a deviation measure threshold of 50 (i.e., five percent of 1000), the third exploration-exploitation keyword extraction iteration may be the final exploration-exploitation keyword extraction iteration as the deviation measure between the keyword count of the per-iteration extracted keyword list for the third exploration-exploitation keyword extraction and the keyword count of the per-iteration extracted keyword list for the immediately preceding exploration-exploitation keyword extraction iteration (i.e., the deviation measure between the per-iteration keyword count of the extracted keyword list for the third exploration-exploitation keyword extraction iteration and the keyword count of the per-iteration extracted keyword list for the second exploration-exploitation keyword extraction iteration, which here is 140−100=40) falls below the deviation measure threshold of 50. However, applying the second thresholding logic discussed in the preceding paragraph given a deviation measure threshold of 50 (i.e., five percent of 1000), the third exploration-exploitation keyword extraction iteration will not be the final exploration-exploitation keyword extraction iteration as the keyword count of the per-iteration extracted keyword list for the third exploration-exploitation keyword extraction iteration does not fall below the deviation measure threshold of 50.

As yet another example, consider a training corpus comprising one thousand identified words. Consider further that: (i) during a first exploration-exploitation keyword extraction iteration, a per-iteration extracted keyword list of 200 words is extracted, (ii) during a second exploration-exploitation keyword extraction iteration, a per-iteration extracted keyword list of 140 words is extracted, (iii) during a third exploration-exploitation keyword extraction iteration, an per-iteration extracted keyword list of 100 words is extracted, and (iv) during a fourth exploration-exploitation keyword extraction iteration, a per-iteration extracted keyword list of 40 words is extracted. In the noted exemplary embodiment, applying the second thresholding logic described above given a deviation measure threshold of 50 (i.e., five percent of 1000), the fourth exploration-exploitation keyword extraction iteration may be the final exploration-exploitation keyword extraction iteration as the keyword count of the per-iteration extracted keyword list for the fourth exploration-exploitation keyword extraction iteration falls below the deviation measure threshold of 50.

Having described the thresholding logic that may be used to determine when exploration-exploitation keyword extraction iterations may terminate, we will now proceed to describe exemplary embodiments of what performing a particular exploration-exploitation keyword extraction iteration may entail. To do so, we will separately describe what performing an initial exploration-exploitation keyword extraction iteration may entail and what performing a non-initial exploration-exploitation keyword extraction iteration (i.e., any exploration-exploitation keyword extraction iteration that occurs subsequent to the initial exploration-exploitation keyword extraction iteration) may entail.

In general, an exploration-exploitation keyword extraction iteration may describe a process characterized by an exploration phase and an exploitation phase. During the exploration phase of an exploration-exploitation keyword extraction iteration, a training corpus comprising a group of training corpus data entries is processed to first generate anomalous data for the exploration-exploitation keyword extraction iteration, then both the anomalous data and the training corpus are used to train a language-model-based binary classification model that is configured to generate an anomaly probability for each input data entry, and then the anomality probabilities generated by the language-model-based binary classification model during training are supplied to an exploitation phase of the exploration-exploitation keyword extraction iteration. During the exploitation phase of an exploration-exploitation keyword extraction iteration, the anomaly probabilities generated during the exploration phase are used to identify keywords for the exploration-exploitation keyword extraction iteration, then encoded representations of the identified keywords (e.g., encoded representations generated using an encoding layer of the language-model-based binary classification model) are used to determine labeled keyword clusters for each identified keyword, and then the labeled keyword clusters are used to update a keyword model associated with the training corpus.

We will now discuss the operations that may occur during an initial exploration-exploitation keyword extraction iteration. During an initial exploration-exploitation keyword extraction iteration, the predictive data analysis computing entity 106 first generates, at step/operation 401, anomaly data based at least in part on the training corpus. To do so, the predictive data analysis computing entity 106 may first randomly select a predefined portion (e.g., 20 percent) of the identified unique words of the training corpus from the training corpus and mark each training corpus data entry affected by this removal process as having a ground-truth label denoting that the affected training corpus data entry is deemed anomalous.

For example, as depicted in FIG. 6, the training corpus 601 has been used to generate the anomalous data 602. In particular, the anomalous data entry 621 has been generated by removing the word "218" from the training corpus data entry 611. In addition, the anomalous data entry 622 has been generated by removing the word "Kings" from the training corpus data entry 612. Also, the anomalous data entry 623 has been generated by removing the word "Center" from the training corpus data entry 613. Furthermore, the anomalous data entry 624 has been generated by removing the word "Gateway" from the training corpus data entry 614. Moreover, the anomalous data entry 625 has been generated by removing the word "NY" from the training corpus data entry 615. Accordingly, the training corpus data entries 611-615 are given the ground-truth label of one indicating that they are deemed non-anomalous, while the anomalous data entries 621-625 are given the ground-truth label of zero indicating that they are deemed anomalous.

The initial exploration-exploitation keyword extraction iteration then continues at step/operation 402 when the predictive data analysis computing entity 106 uses both the training corpus and the anomalous data to train a language-model-based binary classification model. In particular, the predictive data analysis computing entity 106 uses the ground-truth labels associated with the training corpus and the anomalous data that were generated at step/operation 401 to train the language-model-based binary classification model. Moreover, the predictive data analysis computing entity 106 supplies the inferred anomaly scores generated for the input data entries (i.e., for both training corpus data entries and anomalous data entries) during training of the language-model-based binary classification model as anomaly probabilities, which are then used during the exploitation phase of the initial exploration-exploitation keyword extraction iteration to identify keywords and generate a per-iteration extracted keyword list for the initial exploration-exploitation keyword extraction iteration.

For example, given two corpus data entries T1 and T2 and given two anomalous data entries D1 and D2, the predictive data analysis computing entities may first processes the input data entries T1-T2 and D1-D2 using the binary classifier model to generate anomaly scores 11-14 for those input data entries respectively. Afterward, the predictive data analysis computing entity 106 may both use the anomaly scores 11-14 during the exploitation phase and use a measure of deviation of the anomaly scores 11-14 from ground-truth labels for the input data entries T1-T2 and D1-D2 in order to generate gradients of the error function for the language-model-based binary classification model which may in turn be used to train the language-model-based binary classification model.

The language-model-based binary classification model may have the structure that is depicted in FIG. 7. As depicted in FIG. 7, the language-model-based binary classification model 700 has an encoder layer 701, a dropout layer 702, a group of fully connected layers 703, and a softmax layer 704. The encoder layer 701 may be configured to receive an input data object (e.g., a text corpus data entry or an anomalous data entry) and generate an encoded representation of the input data object. Examples of the encoder layer 701 include layers that utilize one or more bidirectional encoders, such as one or more Bidirectional Encoder Representations from Transfer (BERT) models including pre-trained BERT models as well as BERT models trained from scratch. The dropout layer 702 may process the encoded representation generated by the encoder layer 701 in order to generate a dropout representation of the input data object. The group of fully connected layers 703 may be configured to process the dropout representation generated by the dropout layer 702 to generate a non-normalized anomaly probability score. The softmax layer 704 may be configured to process the non-normalized anomaly probability score generated by the group of fully connected layers 703 in order to generate the anomaly probability score.

Following the exploration phase of the initial exploration-exploitation keyword extraction iteration, the exploitation phase of the initial exploration-exploitation keyword extraction iteration is performed. During the exploration phase of the initial exploration-exploitation keyword extraction iteration, at step/operation 403, the predictive data analysis computing entity 106 generates the per-iteration extracted keyword list for the initial exploration-exploitation keyword extraction iteration. To do so, the predictive data analysis computing entity 106 computes a measure of deviation of each anomaly probability for an anomalous data entry from the anomaly probability for the training corpus data entry used to generate the anomalous data entry and uses this measure of deviation as an importance measure for the word removed from the training corpus data entry. Thereafter, the predictive data analysis computing entity 106 determines that each word whose importance measure satisfies an importance measure threshold condition (e.g., whose importance measure is above an importance measure threshold value) is an extracted keyword for the initial exploration-exploitation keyword extraction iteration that should be included in the per-iteration extracted keyword list for the initial exploration-exploitation keyword extraction iteration.

An operational example of generating importance measures for dropped words is depicted in FIG. 8. As depicted in FIG. 8, the importance measure for each word is determined based at least in part on a deviation between the anomaly probability score of an anomaly probability score generated by dropping the word from the training corpus data entry and the anomaly probability score of the noted training corpus data entry. Thus, for example, the importance measure for the word "933" is the measure of deviation between the anomaly probability score of the text corpus data entry "933 bradbury se ste 22222" and the anomaly probability score of the anomalous data entry "bradbury se ste 22222", which is 0.93–0.02=0.91. As another example, the importance measure for the word "bradbury" is the measure of deviation between the anomaly probability score of the text corpus data entry "933 bradbury se ste 22222" and the anomaly probability score of the anomalous data entry "933 se ste 22222", which is 0.93–0.90=0.03. As an additional example, the importance measure for the word "se" is the measure of deviation between the anomaly probability score of the text corpus data entry "933 bradbury se ste 22222" and the anomaly probability score of the anomalous data entry "933 bradbury ste 22222", which is 0.93−0.87=0.06. As yet another example, the importance measure for the word "ste" is the measure of deviation between the anomaly probability score of the text corpus data entry "933 bradbury se ste 22222" and the anomaly probability score of the anomalous data entry "933 bradbury se 22222", which is 0.93−0.37=0.56. As a further example, the importance measure for the word "2222" is the measure of deviation between the anomaly probability score of the text corpus data entry "933 bradbury se ste 22222" and the anomaly probability score of the anomalous data entry "933 bradbury se ste", which is 0.93−0.31=0.62.

If a word is dropped from more than one input data entry, the importance measure for the word is determined based at least in part on a measure of statistical distribution (e.g., an average) of the importance measures calculated for the word on a per-entry basis. For example, if a word is dropped from three sentences, the importance measure for the word may be determined based at least in part on an average of the importance measure for the word determined based at least in part on the first sentence of the three sentences, the importance measure for the word determined based at least in part on the second sentence of the three sentences, and the importance measure for the word determined based at least in part on the third sentence of the three sentences. An operational example of determining an average importance measure for a word based at least in part on average change in anomalous probability due to the word across many sentences is depicted in FIG. 9.

After performing the operations of the initial exploration-exploitation keyword extraction iteration, the predictive data analysis computing entity 106 proceeds to perform the operations of the second exploration-exploitation keyword extraction iteration, which is the first non-initial exploration-exploitation keyword extraction iteration. Here, we will generally describe discuss the operations that may occur during any non-initial exploration-exploitation keyword extraction iteration.

During a non-initial exploration-exploitation keyword extraction iteration, the predictive data analysis computing entity 106 first generates, at step/operation 401, anomaly data based at least in part on the training corpus. To do so, the predictive data analysis computing entity 106 may first remove each identified keyword in the per-iteration extracted keyword list for an immediately prior exploration-exploitation keyword extraction iteration of the non-initial exploration-exploitation keyword extraction iteration (e.g., for the second exploration-exploitation keyword extraction iteration, this would be the initial exploration-exploitation keyword extraction iteration; for the third exploration-exploitation keyword extraction iteration, this would be the second exploration-exploitation keyword extraction iteration; and so on) from the training corpus and mark each training corpus data entry affected by this removal process as having a ground-truth label denoting that the affected training corpus data entry is deemed anomalous.

The non-initial exploration-exploitation keyword extraction iteration then continues at step/operation 402 when the predictive data analysis computing entity 106 uses both the training corpus and the anomalous data to further train a language-model-based binary classification model. In particular, the predictive data analysis computing entity 106 uses the ground-truth labels associated with the training corpus and the anomalous data that were generated at step/operation 401 to train the language-model-based binary classification model. Moreover, the predictive data analysis computing entity 106 supplies the inferred anomaly scores generated for the input data entries (i.e., for both training corpus data entries and anomalous data entries) during training as anomaly probabilities, which are then used during the exploitation phase of the non-initial exploration-exploitation keyword extraction iteration to identify keywords and generate a per-iteration extracted keyword list for the non-initial exploration-exploitation keyword extraction iteration.

Following the exploration phase of the non-initial exploration-exploitation keyword extraction iteration, the exploitation phase of the non-initial exploration-exploitation keyword extraction iteration is performed. During the exploration phase of the non-initial exploration-exploitation keyword extraction iteration, at step/operation 403, the predictive data analysis computing entity 106 generates the per-iteration extracted keyword list for the non-initial exploration-exploitation keyword extraction iteration. To do so, the predictive data analysis computing entity 106 computes a measure of deviation of each anomaly probability for an anomalous data entry from the anomaly probability for the training corpus data entry used to generate the anomalous data entry and uses this measure of deviation as an importance measure for the word removed from the training corpus data entry to generate the anomalous data entry. Thereafter, the predictive data analysis computing entity 106 determines that each word whose importance measure satisfies an importance measure threshold condition (e.g., whose importance measure is above an importance measure threshold value) is an extracted keyword for the non-initial exploration-exploitation keyword extraction iteration that should be included in the per-iteration extracted keyword list for the non-initial exploration-exploitation keyword extraction iteration. If a word is dropped from more than one input data entry, the importance measure for the word is determined based at least in part on a measure of statistical distribution (e.g., an average) of the importance measures calculated for the word on a per-entry basis.

After termination of the exploration-exploitation keyword extraction iterations, the predictive data analysis computing entity 106 may utilize the trained binary classifier encoder machine learning model to perform anomalous text detection. A flowchart diagram of an example process 1300 for performing anomalous text detection is depicted in FIG. 13. The process 1300 begins at step/operation 1301 when the predictive data analysis computing entity 106 receives an input data entry (e.g., an address, a clinical note, a clinical note sentence, and/or the like).

At step/operation 1302, the predictive data analysis computing entity 106 processes the input data entry by the trained binary classifier encoder machine learning to determine an inferred anomaly probability for the input data entry and uses the inferred anomaly probability to determine an anomaly detection conclusion for the input data entry that describes whether the input data entry is deemed anomalous or not. For example, the predictive data analysis computing entity 106 may process the input data entry using the trained binary classifier encoder machine learning model to determine an inferred anomaly probability and determine whether the input data entry is deemed anomalous or not based at least in part on whether the inferred anomaly probability for the noted input data entry satisfies an anomaly probability threshold condition (e.g., falls above an anomaly probability threshold value).

At step/operation 1303, the predictive data analysis computing entity 106 uses a keyword model to determine explanatory metadata for the anomaly detection conclusion.

For example, the predictive data analysis computing entity 106 may utilize the keyword model to determine an address-related input data entry has two pathway type designators and include this determination as part of the explanatory metadata for the inferred anomaly probability for the address-related and/or for a conclusion about whether the address-related input data entry is deemed anomalous or not. As another example, the predictive data analysis computing entity 106 may utilize the keyword model to determine an address-related input data entry has its pathway type designators followed by a building number designator, and include this determination as part of the explanatory metadata for the inferred anomaly probability for the address-related and/or for a conclusion about whether the address-related input data entry is deemed anomalous or not. As a further example, the predictive data analysis computing entity 106 may utilize the keyword model to determine an address-related input data entry has no pathway type designators and include this determination as part of the explanatory metadata for the inferred anomaly probability for the address-related and/or for a conclusion about whether the address-related input data entry is deemed anomalous or not.

In some embodiments, to generate the keyword model, the predictive data analysis computing entity 106 generates a labeled cluster for each word in a per-iteration extracted keyword list generated during an exploration-exploitation keyword extraction iteration. To do so, the predictive data analysis computing entity 106 may first process each keyword identified in the per-iteration extracted keyword list using an encoding machine learning model (e.g., the encoding layer of the language-model-based binary classification model, such as the BERT-based encoding layer of the language-model-based binary classification model) to generate an encoded representation of the identified keyword. Afterward, the predictive data analysis computing entity 106 may process the encoded representations of the identified keywords in the per-iteration extracted keyword list to generate a labeled keyword cluster for each identified keyword. The keyword model can then be used to identify important keywords/entities in the text.

For example, the predictive data analysis computing entity 106 may first perform dimensionality reduction (e.g., using a principal component analysis layer) on the encoded representations of the identified keywords in a per-iteration extracted keyword list to generate reduced encoded representations of the noted encoded representations. An operational example of results of performing such a dimensionality reduction that uses principal component analysis to reduce the dimensions of the encoded representations from the 768 dimensions of a BERT encoded representation is depicted in FIG. 10. After performing the dimensionality reduction, the predictive data analysis computing entity 106 may process the reduced representations of the identified keywords using a t-distributed stochastic neighbor embedding layer to generate an unlabeled keyword cluster for each identified keyword and subsequently use the unlabeled keyword cluster using a K-means layer to generate the labeled keyword cluster for the per-keyword encoded representation. In some embodiments, the K-means layer may use the elbow method using distribution. An operational example of the results of performing t-distributed stochastic neighbor embedding on reduced encoded representations of identified keywords is depicted in FIG. 11, while an operational example of the results of performing K-means on unlabeled keyword clusters generated using t-distributed stochastic neighbor embedding is depicted in FIG. 12.

At step/operation 1304, the predictive data analysis computing entity 106 uses the anomaly detection conclusion and the explanatory metadata for the anomaly detection conclusion to perform one or more prediction-based actions. For example, the predictive data analysis computing entity 106 may generate and cause the presentation of a prediction output user interface that is configured to present, for each input data entry, an anomaly detection conclusion as well as explanatory metadata for the anomaly detection conclusion. For example, as depicted in FIG. 14, the prediction output user interface 1400 depicts that the input data object 1401 is likely anomalous because it has no pathway designators, while data object 1402 is likely anomalous because the building number follows the street number, and data object 1403 is deemed likely non-anomalous.

It should be noted that, while various embodiments of the present invention describe generating a trained binary classifier model (e.g., in accordance with aspects of process 400 of FIG. 4), generating a keyword model (e.g., in accordance with aspects of process 400 of FIG. 4), and performing an anomalous text detection (e.g., in accordance with aspects of process 1300 of FIG. 13) using a single computing entity, a person of ordinary skill in the relevant technology will recognize that the three noted tasks may be performed by any number of computer entities. For example, a first computing entity may generate a trained binary classifier model and a keyword model, while a second computing entity may perform anomalous text detection. As another example, a first computing entity may generate a trained binary classifier model, a second computing entity may generate a keyword model, and a third computing entity may perform anomalous text detection.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
  receiving, by one or more processors and via a plurality of exploration-exploitation keyword extraction iterations, a keyword list (i) based at least in part on a plurality of training corpus data entries and (ii) that satisfies a keyword list threshold condition, wherein an exploration-exploitation keyword extraction iteration of the plurality of exploration-exploitation keyword extraction iterations comprises:
    (i) modifying the plurality of training corpus data entries by generating one or more anomalous data entries based at least in part on a prior per-iteration keyword list of a prior exploration-exploitation keyword extraction iteration that temporally precedes the exploration-exploitation keyword extraction iteration,
    (ii) training a language-model-based binary classification model based at least in part on the one or more anomalous data entries, wherein the language-model-based binary classification model comprises:

(a) a bidirectional encoder layer that is configured to process the one or more anomalous data entries to generate an encoded representation,
(b) a dropout layer that is configured to process the encoded representation to generate a dropout representation,
(c) a fully-connected layer that is configured to process the dropout representation to generate a fully connected output; and
(d) a softmax layer that is configured to process the fully connected output to generate an anomaly probability for the one or more anomalous data entries,
(iii) inputting the one or more anomalous data entries to the language-model-based binary classification model to generate one or more per-entry anomaly probabilities, and
(iv) generating a per-iteration keyword list for the exploration-exploitation keyword extraction iteration based at least in part on the one or more per-entry anomaly probabilities, wherein the keyword list comprises the per-iteration keyword list for an ultimate exploration-exploitation keyword extraction iteration of the plurality of exploration-exploitation keyword extraction iterations; and
updating, by the one or more processors, a keyword model associated with the language-model-based binary classification model based at least in part on the keyword list, wherein the keyword model is configured to provide explanatory metadata for one or more inferred anomaly probabilities output by the language-model-based binary classification model.

2. The computer-implemented method of claim 1, wherein the prior exploration-exploitation keyword extraction iteration is an initial exploration-exploitation keyword extraction iteration of the plurality of exploration-exploitation keyword extraction iterations and the one or more anomalous data entries of the initial exploration- exploitation keyword extraction iteration are generated by removing randomly-selected removable words from one or more training corpus data entries of the plurality of training corpus data entries.

3. The computer-implemented method of claim 1, wherein updating the keyword model comprises:
inputting a keyword of the keyword of the keyword list to the bidirectional encoder layer to generate a per-keyword encoded representation of the keyword; and
generating, using a label-generating machine learning model, a labeled keyword cluster based at least in part on the per-keyword encoded representation.

4. The computer-implemented method of claim 3, wherein generating the labeled keyword cluster comprises:
generating, using a principal component analysis layer, a reduced representation of the per-keyword encoded representation;
generating, using a t-distributed stochastic neighbor embedding layer, an unlabeled keyword cluster for the per-keyword encoded representation based at least in part on the reduced representation; and
generating, using a K-means layer, the labeled keyword cluster for the per-keyword encoded representation based on the unlabeled keyword cluster.

5. The computer-implemented method of claim 1, wherein the keyword list threshold condition is satisfied when a deviation measure between the per-iteration keyword list and a prior per-iteration keyword list of the prior exploration-exploitation keyword extraction iteration satisfies a threshold deviation measure.

6. The computer-implemented method of claim 1, wherein the keyword list threshold condition is satisfied when a keyword count for the per-iteration keyword list satisfies a threshold keyword count measure.

7. The computer-implemented method of claim 1, further comprising:
inputting one or more input corpus data entries to the language-model-based binary classification model to generate the one or more inferred anomaly probabilities for the one or more input corpus data entries;
generating, using the keyword model, the explanatory metadata for the one or more inferred anomaly probabilities; and
initiating the performance of one or more prediction-based actions based at least in part on the one or more inferred anomaly probabilities and the explanatory metadata.

8. A system comprising memory and one or more processors communicatively coupled to the memory, the one or more processors configured to:
receive, via a plurality of exploration-exploitation keyword extraction iterations, a keyword list (i) based at least in part on a plurality of training corpus data entries and (ii) that satisfies a keyword list threshold condition, wherein an exploration-exploitation keyword extraction iteration of the plurality of exploration-exploitation keyword extraction iterations comprises:
(i) modifying the plurality of training corpus data entries by generating one or more anomalous data entries based at least in part on a prior per-iteration keyword list of a prior exploration-exploitation keyword extraction iteration that temporally precedes the exploration-exploitation keyword extraction iteration,
(ii) training a language-model-based binary classification model based at least in part on the one or more anomalous data entries, wherein the language-model-based binary classification model comprises:
(a) a bidirectional encoder layer that is configured to process the one or more anomalous data entries to generate an encoded representation,
(b) a dropout layer that is configured to process the encoded representation to generate a dropout representation of the input data object,
(c) a fully-connected layer that is configured to process the dropout representation to generate a fully connected output; and
(d) a softmax layer that is configured to process the fully connected output to generate an anomaly probability for the one or more anomalous data entries,
(iii) inputting the one or more anomalous data entries to the language-model-based binary classification model to generate one or more per-entry anomaly probabilities, and
(iv) generating a per-iteration keyword list for the exploration-exploitation keyword extraction iteration based at least in part on the one or more per-entry anomaly probabilities, wherein the keyword list comprises the per-iteration keyword list for an ultimate exploration-exploitation keyword extraction iteration of the plurality of exploration-exploitation keyword extraction iterations; and
update a keyword model associated with the language-model-based binary classification model based at least in part on the keyword list, wherein the keyword model is configured to provide explanatory metadata for one or more inferred anomaly probabilities output by the language-model-based binary classification model.

9. The system of claim 8, wherein the prior exploration-exploitation keyword extraction iteration is an initial exploration-exploitation keyword extraction iteration of the plurality of exploration-exploitation keyword extraction iterations and the one or more anomalous data entries of the initial exploration-exploitation keyword extraction iteration are generated by removing randomly-selected removable words from one or more training corpus data entries of the plurality of training corpus data entries.

10. The system of claim 8, wherein updating the keyword model comprises:
   inputting a keyword of the keyword list to the bidirectional encoder layer to generate a per-keyword encoded representation of the keyword; and
   generating, using a label-generating machine learning model, a labeled keyword cluster based at least in part on the per-keyword encoded representation.

11. The system of claim 10, wherein generating the labeled keyword cluster comprises:
   generating, using a principal component analysis layer, a reduced representation of the per-keyword encoded representation;
   generating, using a t-distributed stochastic neighbor embedding layer, an unlabeled keyword cluster for the per-keyword encoded representation based at least in part on the reduced representation; and
   generating, using a K-means layer, the labeled keyword cluster for the per-keyword encoded representation based on the unlabeled keyword cluster.

12. The system of claim 8, wherein the keyword list threshold condition is satisfied when a keyword count for the per-iteration keyword list satisfies a threshold keyword count measure.

13. The system of claim 8, wherein the keyword list threshold condition is satisfied when a deviation measure between the per-iteration keyword list and a prior per-iteration keyword list of the prior exploration-exploitation keyword extraction iteration satisfies a threshold deviation measure.

14. One or more non-transitory computer-readable storage media including instructions that, when executed by one or more processors, cause the one or more processors to:
   receive, via a plurality of exploration-exploitation keyword extraction iterations, a keyword list (i) based at least in part on a plurality of training corpus data entries and (ii) that satisfies a keyword list threshold condition, wherein an exploration-exploitation keyword extraction iteration of the plurality of exploration-exploitation keyword extraction iterations comprises:
   (i) modifying the plurality of training corpus data entries by generating one or more anomalous data entries based at least in part on a prior per-iteration keyword list of a prior exploration-exploitation keyword extraction iteration that temporally precedes the exploration-exploitation keyword extraction iteration,
   (ii) training a language-model-based binary classification model based at least in part on the one or more anomalous data entries, wherein the language-model-based binary classification model comprises:
      (a) a bidirectional encoder layer that is configured to process the one or more anomalous data entries to generate an encoded representation,
      (b) a dropout layer that is configured to process the encoded representation to generate a dropout representation of the input data object,
      (c) a fully-connected layer that is configured to process the dropout representation to generate a fully connected output; and
      (d) a softmax layer that is configured to process the fully connected output to generate an anomaly probability for the one or more anomalous data entries,
   (iii) inputting the one or more anomalous data entries to the language-model-based binary classification model to generate one or more per-entry anomaly probabilities, and
   (iv) generating a per-iteration keyword list for the exploration-exploitation keyword extraction iteration based at least in part on the one or more per-entry anomaly probabilities, wherein the keyword list comprises the per-iteration keyword list for an ultimate exploration-exploitation keyword extraction iteration of the plurality of exploration-exploitation keyword extraction iterations; and
   update a keyword model associated with the language-model-based binary classification model based at least in part on the keyword list, wherein the keyword model is configured to provide explanatory metadata for one or more inferred anomaly probabilities output by the language-model-based binary classification model.

15. The one or more non-transitory computer-readable storage media of claim 14, wherein the prior exploration-exploitation keyword extraction iteration is an initial exploration-exploitation keyword extraction iteration of the plurality of exploration-exploitation keyword extraction iterations and the one or more anomalous data entries of the initial exploration-exploitation keyword extraction iteration are generated by removing randomly-selected removable words from one or more training corpus data entries of the plurality of training corpus data entries.

* * * * *

UNITED STATES PATENT AND TRADEMARK OFFICE
CERTIFICATE OF CORRECTION

PATENT NO. : 12,299,543 B2
APPLICATION NO. : 17/018430
DATED : May 13, 2025
INVENTOR(S) : Vineet Shukla et al.

Page 1 of 1

It is certified that error appears in the above-identified patent and that said Letters Patent is hereby corrected as shown below:

In the Claims

In Column 27, Lines 39-40, Claim 2, delete "exploration- exploitation" and insert -- exploration-exploitation --, therefor.

In Column 27, Line 46, Claim 3, delete "of the keyword of the keyword" and insert -- of the keyword --, therefor.

Signed and Sealed this
Twenty-second Day of July, 2025

Coke Morgan Stewart
*Acting Director of the United States Patent and Trademark Office*